United States Patent
Blecha et al.

(10) Patent No.: US 10,876,637 B2
(45) Date of Patent: Dec. 29, 2020

(54) CLOSURE ELEMENT FOR A VACUUM SEAL HAVING A FRICTION STIR WELDING CONNECTION

(71) Applicant: VAT HOLDING AG, Haag (CH)

(72) Inventors: Thomas Blecha, Feldkirch (AT); Rudolf Gfeller, Sevelen (CH); Max Hossfeld, Dietikon (CH)

(73) Assignee: VAT HOLDING AG, Haag (CH)

( * ) Notice: Subject to any disclaimer, the term of this patent is extended or adjusted under 35 U.S.C. 154(b) by 204 days.

(21) Appl. No.: 15/282,146

(22) Filed: Sep. 30, 2016

(65) Prior Publication Data

US 2017/0097097 A1    Apr. 6, 2017

(30) Foreign Application Priority Data

Oct. 2, 2015   (EP) .................................. 15188085

(51) Int. Cl.
*F16K 3/02* (2006.01)
*F16K 3/314* (2006.01)
(Continued)

(52) U.S. Cl.
CPC ........ *F16K 3/0218* (2013.01); *B23K 20/1265* (2013.01); *F16K 3/314* (2013.01); *F16K 51/02* (2013.01)

(58) Field of Classification Search
CPC ........ F16K 3/0218; F16K 3/314; F16K 51/02; B23K 20/1265
See application file for complete search history.

(56) References Cited

U.S. PATENT DOCUMENTS

| 4,809,950 A | 3/1989 | Geiser |
| 4,881,717 A | 11/1989 | Geiser |

(Continued)

FOREIGN PATENT DOCUMENTS

| CH | 6999258 B1 | 2/2010 |
| CN | 1968783 A | 5/2007 |

(Continued)

OTHER PUBLICATIONS

Machine translation from JPO for JP 2004-058084 A.
Machine translation from JPO for JP 2005-186083 A.
Machine translation from JPO for JP 2008-036659 A.

*Primary Examiner* — Marina A Tietjen
(74) *Attorney, Agent, or Firm* — Muncy, Geissler, Olds & Lowe, P.C.

(57) ABSTRACT

Closure element for a vacuum valve having a valve disk realized for the gas-tight closure of a process volume by means of interaction with a vacuum valve opening of the vacuum valve provided for the process volume, wherein the valve disk comprises a closure side and an oppositely situated rear side which is substantially parallel thereto and a first sealing face which is assigned to the closure side and corresponds to a second sealing face of the vacuum valve opening, in particular with regard to form and size, with cured-on sealing material, wherein the second sealing face runs around the vacuum valve opening, and a cross carrier with a receiving means for a drive component transversely with respect to an extension direction of the cross carrier, wherein the cross carrier is connected to the valve disk on the rear side of the valve disk at at least one connection point. The connection of the cross carrier to the valve disk comprises a friction stir welding connection at the at least one connection point.

14 Claims, 6 Drawing Sheets

(51) Int. Cl.
*F16K 51/02* (2006.01)
*B23K 20/12* (2006.01)

(56) References Cited

U.S. PATENT DOCUMENTS

| | | | |
|---|---|---|---|
| 6,056,266 A | 5/2000 | Blecha | |
| 6,089,537 A | 7/2000 | Olmsted | |
| 6,172,320 B1* | 1/2001 | Krishnan | B23K 35/383 |
| | | | 219/101 |
| 6,416,037 B1 | 7/2002 | Geiser | |
| 6,471,181 B2 | 10/2002 | Duelli | |
| 6,629,682 B2 | 10/2003 | Duelli | |
| 8,955,734 B2 | 2/2015 | Steel et al. | |
| 2005/0120535 A1 | 6/2005 | Gendou | |
| 2005/0178817 A1 | 8/2005 | Takase | |
| 2007/0286923 A1* | 12/2007 | Jenko | B29C 45/2806 |
| | | | 425/549 |
| 2008/0066811 A1 | 3/2008 | Duelli | |
| 2008/0135405 A1 | 6/2008 | Hori et al. | |
| 2010/0065611 A1 | 3/2010 | Fukuda | |
| 2011/0108750 A1* | 5/2011 | Ehrne | F16K 3/314 |
| | | | 251/319 |
| 2012/0055977 A1 | 3/2012 | Steel et al. | |

FOREIGN PATENT DOCUMENTS

| | | |
|---|---|---|
| CN | 103108720 A | 5/2013 |
| CN | 204308404 U | 5/2015 |
| DE | 102008061315 B4 | 6/2010 |
| EP | 2913573 A1 | 9/2015 |
| JP | 2004-058084 A | 2/2004 |
| JP | 2005-161382 A | 6/2005 |
| JP | 2005-186083 A | 7/2005 |
| JP | 2005-224846 A | 8/2005 |
| JP | 2008-036659 A | 2/2008 |
| JP | 6241344 B2 | 10/2015 |

\* cited by examiner

CLOSURE ELEMENT FOR A VACUUM SEAL HAVING A FRICTION STIR WELDING CONNECTION

This application claims priority to European Patent Application No.:15188085.3, which was filed in the European Patent Office on Oct. 2, 2015, and which is herein incorporated by reference in its entirety.

The invention relates to a closure element for a vacuum valve and to such a valve having a valve disk and a cross carrier, which is fastened to the valve disk, according to the preambles of claims 1 and 10 as well as to a method for producing a connection between the valve disk and the cross carrier according to claim 11 and to a product produced by means of said method according to claim 12.

Generally speaking, different embodiments of vacuum valves for the substantial gas-tight closure of a flow path which runs through an opening formed in a valve housing are known in the prior art.

Vacuum gate valves are used, in particular, in the area of IC and semiconductor manufacturing which has to take place in a protected environment where possible without the presence of contaminating micro particles. For example, in a production line for semiconductor wafers or liquid crystal substrates, the highly sensitive semiconductor elements or liquid crystal elements run sequentially through several process chambers, in each of which the semiconductor elements situated inside the process chamber are processed by means of a processing device. Both during the processing process inside the process chamber and during transport from process chamber to process chamber, the highly sensitive semiconductor elements must always be situated in a protected environment—in particular in a vacuum.

The process chambers are connected together, for example by means of connecting passages, it being possible to open the process chambers by means of vacuum gate valves to transfer the parts from the one to the next process chamber and subsequently to close said process chambers in a gas-tight manner so as to carry out the respective production step. Such valves are also called vacuum transfer valves on account of the described area of application and rectangular gate valves on account of their rectangular opening cross section.

As transfer valves are used, among other things, for the production of highly sensitive semiconductor elements, particle generation, which is caused in particular as a result of the actuation of the valve and as a result of the mechanical load on the valve closure member, and the number of free particles in the valve chamber have to be kept as low as possible. Particle generation is primarily a result of friction, for example produced by metal to metal contact, and as a result of abrasion.

In dependence on the respective drive technologies, the difference is made, in particular, between gate valves, also called valve sliders or rectangular sliders, and pendulum valves, the closing and opening being effected in the majority of cases in two steps in the prior art. In a first step, a valve closure member, in particular a closure disk, in the case of a gate valve, such as, for example, disclosed in U.S. Pat. No. 6,416,037 (Geiser) or U.S. Pat. No. 6,056,266 (Blecha), in particular of the L-type, is slid in a linear manner over an opening substantially parallel to the valve seat or in the case of a pendulum valve, such as, for example, disclosed in U.S. Pat. No. 6,089,537 (Olmsted), is pivoted about a pivot axis over the opening without, in this connection, any contact occurring between the closure disk and the valve seat of the valve housing. In a second step, the closure disk is pressed onto the valve seat of the valve housing by way of the closure side thereof such that the opening is closed in a gas-tight manner. The sealing can be effected, for example, either by means of a seal which is arranged on the closure side of the closure disk and is pressed onto the valve seat which runs around the opening, or by means of a sealing ring on the valve seat, against which the closure side of the closure disk is pressed. The seal, in particular the sealing ring, can be held in a groove and/or can be cured-on.

Different sealing devices are disclosed in the prior art, for example in U.S. Pat. No. 6,629,682 B2 (Duelli). A suitable material for sealing rings and seals in the case of vacuum valves is, for example, fluorinated rubber, also called FKM, in particular the Fluor elastomer which is known under the trade name of Viton®, as well as per fluorinated rubber, in short FFKM.

The advantage of the described two-stage movement, where the closure member is initially slid transversely over the opening without there being any contact between the seal and the valve seat, and the closure member is subsequently pressed substantially vertically onto the valve seat, along with the possibility of controlling the flow in a precise manner, is above all that the seal is pressed almost exclusively vertically without there being any transverse or longitudinal load on the seal. Either one single drive, which enables an L-shaped movement of the closure member, or a plurality of drives, for example two linear drives or one linear and one expansion drive, can be used for this purpose.

In addition, gate valves are known where the closing and sealing operation is certainly effected by means of one single linear movement, but the sealing geometry is such that a shear load on the seal is completely avoided. Such a valve is, for example, the transfer valve produced by VAT Vakuumventile AG in Haag, Switzerland, which is known under the product name of "MONOVAT series 02 and 03" and is developed as a rectangular insert valve. The design and method of operation of such a valve are described, for example, in U.S. Pat. No. 4,809,950 (Geiser) and U.S. Pat. No. 4,881,717 (Geiser).

The valve described there has, in its housing, a sealing face which, when viewed in the direction of the axis of the valve through-opening, has portions which are located one behind another and merge into flat sealing face portions, which extend outward to the side, by means of continuously extending curvatures, the imaginary generatrices of said single-part sealing face, which, however, comprises several portions, being located parallel to the axis of the valve through-opening.

A suitable drive for such a transfer valve, which is closable by means of a linear movement, is shown in JP 6241344 (Buriiida Fuuberuto). The drive described there has eccentrically mounted levers for the linear displacement of the pushrods, on which the closure member is mounted.

In a popular embodiment of the above-named valve types, the closure member and the valve drive are connected by means of at least one adjustment arm, in particular a pushrod or valve rod. In this connection, the rigid adjustment arm is connected rigidly to the closure member by way of its one end and rigidly to the valve drive by way of its other end. The closure disk in the case of the majority of valves is connected to the at least one pushrod by means of screw connection.

CH 699 258 B1 describes a vacuum valve with a closure disk in which at least one rod receiving means is formed, and at least one pushrod on which the closure disk is removably mounted by means of a connection portion of the pushrod which engages in the rod receiving means. The rod receiving means is realized as a blind hole into which the pushrod is inserted by way of its connection portion. The closure disk comprises a clamping element, which projects adjustably into the blind hole and is realized in such a manner that there is a clamping connection between the closure disk and the connection portion which is releasable as a result of adjusting the clamping element. A particle-sealing sealing ring is arranged between the blind hole and the pushrod in such a manner that particles generated by the clamping connection are prevented from escaping out of the blind hole, as a result of which the number of unwanted particles, caused by material friction, in the valve chamber is kept low and the ability to assemble and disassemble the closure disk in a quick and convenient manner on the at least one pushrod is made possible.

DE 10 2008 061 315 B4 describes a suspension of a valve disk on a valve rod by means of a cross carrier which extends transversely with respect to the valve rod. The cross carrier is connected to the valve rod at a central connection point in particular by means of a screw and is connected to the valve disk, in particular by means of a screw connection, at at least two lateral connection points which are located on both sides of the central connection point. In a central portion which includes the central connection point and portions of the cross carrier which connect on both sides of said central connection point, the cross carrier is at a spacing from the valve disk. By means of said simply realized suspension, a certain pivoting, for example within the range of 1°, of the valve disk in relation to the valve rod about a pivot axis, which is at right angles to the valve rod, is made possible as a result of twisting the cross carrier. A very simple realization can be achieved as a result. The cross carrier can preferably be realized materially in one piece and, in particular, totally from metal.

U.S. Pat. No. 6,471,181 B2 describes a similar suspension. A cross carrier which is to be connected to the valve rod includes a first plate which comprises a conical opening for receiving the end of the valve rod which is screw-connected to the first plate. Elastic bearing blocks, on the sides of which, which are located opposite the first plate, second plates are mounted which are each screw-connected to the valve disk, are mounted on both sides of the central connection point to the valve rod. By means of said elastic bearing blocks, tilting about an axis which is at right angles to the valve rod is made possible such that more uniform pressing of the seal of the valve disk against the valve seat is achieved.

US 2008/0066811 A1 describes a vacuum valve where a valve disk is connected to first and second cross carriers. The cross carriers are connected to the valve disk by means of connecting members. Said connecting members comprise connecting arms, which extend on both sides from a connection point to the cross carrier in the longitudinal direction of the cross carrier and are connected at the end to a common connecting portion, which extends in the longitudinal direction of the cross carrier and is screw-connected at several points on the valve disk at spacings in the longitudinal direction of the cross carrier. A more uniform transmission of force is to be achieved in the longitudinal direction of the cross carrier as a result.

Common to said embodiments is that a respective valve disk is connected to the corresponding cross carrier by means of several screw connections which are also present, in particular, inside the vacuum region.

Screw connections inside a vacuum region harbor the risk of so-called virtual inner vacuum leakage as certain parts of the thread of the screw connection are closed in a more or less gas-tight manner from the remaining surroundings when the valve interior is evacuated and consequently the gas remaining in part in the thread after evacuation escapes slowly and contaminates the valve interior. For this reason, connecting channels and connecting slots which lead into the thread portions are created in the prior art, as a result of which the threads are ventilated. Consequently, no gas is able to remain in the thread during evacuation.

In other words, measures are taken in a conscious manner in the case of vacuum valves in order to avoid inner gas regions, which are possibly situated inside the vacuum region of a vacuum valve and are surrounded by the vacuum region, by said inner gas regions being ventilated in particular by means of ventilation bores and consequently being connected to the vacuum region. In the case of screw connections, this is effected by means of the described connecting channels or connecting slots or also bores in a screw.

Said conscious thread ventilation is known in the case of vacuum valves for screw connections inside a vacuum region and is already being used in the case of valve models that are on the market.

It has, however, been shown that said thread ventilation, which is created consciously to avoid virtual inner vacuum leakages above all in the case of wanted or unwanted minimum relative movements between the parts that are connected by means of the screw connection, can be disadvantageous as small friction particles are generated inside the thread in the form of micro-particles which escape through the ventilation channels or ventilation slots and contaminate the valve interior. Such particles can be generated not only in the thread but at other contact points of a screw. This is above all the case with metal threads. The production process is influenced in a negative manner as a result. In the case of conventional screw connections in the vacuum region, the relative movement of the thread parts is, however, of such a small size that up to now particle generation has been viewed as negligible.

However, in the case of certain connection types, a relative movement in the thread is unavoidable. Such a relative movement in the thread and resultant particle generation can occur, in particular, in the case of the above-described type of valve which is disclosed in DE 10 2008 061 315 B4, as in the case of said valve, the cross carrier is consciously elastically deformed to enable a pivoting movement about the imaginary pivot axis.

Generally speaking, screw connections inside a vacuum region of a vacuum valve harbor the risk of generating unwanted, process-damaging friction particles in the form of micro-particles which are created as a result of a relative movement between the threads.

It is consequently an object of the invention to provide a closure element for a vacuum valve or a vacuum valve with a mechanically coupled second component, in particular a cross carrier, the number of friction particles generated inside the vacuum region being avoided or kept low.

Said object is achieved by the realization of the features of the independent claims. Features which develop the invention further in an alternative or advantageous manner are to be found in the dependent claims.

The concept underlying the invention is to provide a welding connection for fastening the cross carrier on a valve disk for a vacuum valve in place of a screw connection, said welding connection being a special weld in the form of a friction stir welding connection (FSW=friction stir welding). Said method is advantageous in particular on account of the fact that no further welding materials whatsoever are required in this connection since the material is able to be transformed below the respective fusion point and, consequently, the structural requirements on the parts to be produced can remain largely unimpaired, and since a comparatively small amount or no material abrasion occurs. In addition, the connection which can be produced in this manner is very sturdy and resilient. In particular, as a result of avoiding particle residues in the connection region, made possible in this manner, a clear improvement is achieved with regard to possible sources of contaminants inside the vacuum region.

The invention relates to a closure element for a vacuum valve having a valve disk which is realized for the gas-tight closure of a process volume by means of interaction with a vacuum valve opening of the vacuum valve provided for the process volume. The valve disk has a closure side (in particular facing the process volume) and an oppositely situated rear side which is substantially parallel thereto and a first sealing face which is assigned to the closure side and corresponds to a second sealing face of the vacuum valve opening, in particular with regard to form and size, with in particular cured-on sealing material, wherein the second sealing face runs around the vacuum valve opening. The closure element additionally has a cross carrier with a receiving means for a drive component, e.g. a valve rod, transversely with respect to an extension direction of the cross carrier, wherein the cross carrier is connected to the valve disk on the rear side of the valve disk at at least one connection point.

The cross carrier serves, as already described for example, for connecting a drive rod and/or for stabilizing (pre-stress) the valve disk.

According to the invention, the connection between the cross carrier and the valve disk at the at least one connection point comprises a friction stir welding connection.

For this purpose, the friction stir welding connection is as a result of guiding a welding tool in a substantially (purely) vertical manner (substantially orthogonally with respect to the surface of the valve disk or of the cross carrier) in such a manner that the tool makes the material of the cross carrier and of the valve disk deformable (plasticizes).

According to one embodiment, the closure element has more than one connection point, that is to say several points at which a connection is realized between the cross carrier and the valve disk. The cross carrier is then preferably connected to the rear side of the valve disk by means of two connection points, the two connections being realized in each case by means of a friction stir welding connection.

According to a further embodiment, the cross carrier comprises the receiving means for the drive components centrally on the cross carrier, the, for example, two connection points being arranged horizontally on both sides relative to the receiving means.

The friction stir welding connection can be formed, in particular, from the side of the closure surface of the valve disk or proceeding from the top surface of the cross carrier. An indentation remains on the workpiece on the respective side from which a corresponding friction stir welding tool is positioned for producing the connection.

The friction stir welding tool, e.g. a pin which projects from a shoulder, is moved in particular orthogonally with respect to an extension direction of the valve disk (orthogonally with respect to the surface of the closure side or of the rear side) or of the cross carrier. In this case, the punch (tool) is pressed whilst rotating onto or into the material of the disk or of the carrier, as a result of which the material thereof is (deformably) plasticized. As a result of moving (pushing) the tool further in said direction, the second component is also reached and the material thereof plasticized. As a result of the continuous rotation of the tool, the materials of the two components in the plasticized state are stirred into one another, as a result of which a material bond is created. The tool is then removed from the closure element in the opposite direction. The material bond, i.e. the welding connection, is retained.

In dependence on a desired size or wanted stability of the connection, the entire tool can be guided, for example, in a circular or helical movement, whilst the materials to be connected are already present in a plasticized state. As a result, a correspondingly larger region is able to be generated in which a material bond produced from both materials is present.

According to a specific embodiment, at the at least one connection point, the closure element comprises an indentation which extends substantially parallel to an axis, which is orthogonal with respect to a plane, which is defined by the form or surface of the rear side or closure side.

The opening of the indentation is present in particular on the side of the cross carrier. In said realization, the friction stir welding connection has been generated on the side of the cross carrier. The surface of the closure side of the valve disk does not comprise any structural modification in this connection.

According to a further embodiment, on the closure side the closure element can comprise an indentation which is assigned to the at least one connecting part, the indentation extending substantially parallel to said axis. In other words, the indentation is open toward the closure side.

According to an embodiment of the invention, the indentation extends over a defined depth in the direction of said axis, the depth being greater than a material thickness of the cross carrier or of the valve disk at the connection point. If the indentation is open toward the valve disk, the depth of the indentation is greater than the thickness of the disk at said point, if the indentation is open toward the cross carrier, the depth of the indentation is greater than the thickness of the cross carrier at said point.

In particular, the indentation is formed on the side of the cross carrier in such a manner that the indentation extends right through the cross carrier and projects into the valve disk.

As an alternative to this, the indentation is formed on the side of the valve disk in such a manner that the indentation extends right through the valve disk and projects into the cross carrier.

As a result of the two above variants, a stirring of the materials of the cross carrier and of the valve disk is generated in a desired manner, i.e. such that parts of both components have been plasticized and connected.

According to an embodiment of the invention, a material bond which is created by intermittent plasticizing of the materials of the cross carrier and of the valve disk is present in a transition region at the connection point, wherein the transition region is defined at the connection point by a portion which extends along the axis via a contact point of the cross carrier with the valve disk.

The friction stir welding connection can additionally provide a homogeneous material transition between the valve disk and the cross carrier, i.e. along a direction in which the connecting tool (e.g. rotating pin) is moved or pressed into the materials of the components to be connected for producing the connection. In particular, in this case, a gap-free connection is generated and provided between the two parts.

The invention also relates to a vacuum valve for the gas-tight closure of a process volume, said vacuum valve having a valve housing which comprises a vacuum valve opening and a valve seat which runs around the vacuum valve opening and comprises a second sealing face, and having a valve disk for the substantial gas-tight closing of the vacuum valve opening with a first sealing face which corresponds to the second sealing face. The vacuum valve additionally comprises a cross carrier having a receiving means for a drive component (e.g. valve rod) transversely with respect to an extension direction of the cross carrier, where the cross carrier is connected to the valve disk on a rear side of the valve disk at at least one connection point. In addition, the vacuum valve has a drive unit which is coupled with the cross carrier by means of the receiving means and which is realized in such a manner that the valve disk is adjustable from an open position, in which the valve disk releases the vacuum valve opening, into a closed position, in which the first sealing face of the valve disk is pressed onto the second sealing face and the vacuum valve opening is closed in a substantially gas-tight manner, and back, in particular at least substantially along a geometric longitudinal axis in a longitudinal closing direction. In particular, as a result of a capability of the valve disk to move substantially along a geometric transverse axis, which extends at right angles to the longitudinal axis, it can be adjustable in a transverse closing direction into an intermediate position, in which the valve disk covers the vacuum valve opening and a closure side of the valve disk is situated in a position at a spacing opposite the valve seat, and back.

According to the invention, the connection between the cross carrier and the valve disk at the at least one connection point comprises a friction stir welding connection, in particular wherein a closure element, which comprises the valve disk and the cross carrier, is realized according to any one of the above approaches.

The invention additionally relates to a method for producing a closure element having a cross carrier for a vacuum valve, having a physical first part and an equally structural second part, wherein the first part and the second part each embody either a valve disk or the cross carrier. The first part therefore embodies the valve disk of the closure element and the second part embodies the cross carrier of the closure element, or vice versa.

A joining tool is equipped with the first and the second part. The equipped joining tool is introduced into a joining machine, in particular into a welding machine, in particular into a machine tool (processing center) or a milling machine, in particular a friction stir welding machine. A friction stir welding connection is produced between the cross carrier and the valve disk as a result of interaction between the joining machine and the first and second part.

For example, a friction stir welding tool in the form, for example, of a pin, is made to rotate by means of the machine. The pin is then pressed onto a side of the closure element at the desired connection point. The tool continues to be moved in the direction of the material thickness of the parts to be connected until plasticization of the material has set in or is present at said point of the two components and the materials are stirred into one another. Once the tool has been removed and the joint cooled, a permanent material bond is consequently present.

In other words, the joining of the two components is effected in particular as follows: the joining machine comprises a connecting tool, in particular a pin which projects from a shoulder, the connecting tool is made to rotate by means of the joining machine about a linear movement axis, in particular concentrically about a longitudinal axis of the connecting tool, and the rotating connecting tool is pressed deeply into the first part along the movement axis in such a manner that the connecting tool passes through the first part with regard to the thickness thereof in the direction of the movement axis and the connecting tool penetrates into the body of the second part.

According to one embodiment, with the material of the first part and the material of the second part in a plastically deformable state, the connecting tool is guided orthogonally with respect to the movement axis along a defined trajectory, in particular in a circular or helical manner in a plane orthogonally with respect to the movement axis. A gap-free connection between the two parts (valve disk and cross carrier) can be reliably produced as a result of such an orthogonal relative movement (orthogonal relative to the longitudinal axis of the pin embodying the connecting tool). Being free of gaps in such a manner is particularly advantageous for components and applications in vacuum technology (with regard to avoiding particles).

In addition, the invention relates to a closure element which is obtained as a result of carrying out an above-described method, in particular wherein a closure element is according to the invention.

The method according to the invention and the device according to the invention are described in more detail below in a purely exemplary manner by way of concrete exemplary embodiments which are shown schematically in the drawings, further advantages of the invention also being discussed. The drawings in detail are as follows.

Figure 1A:
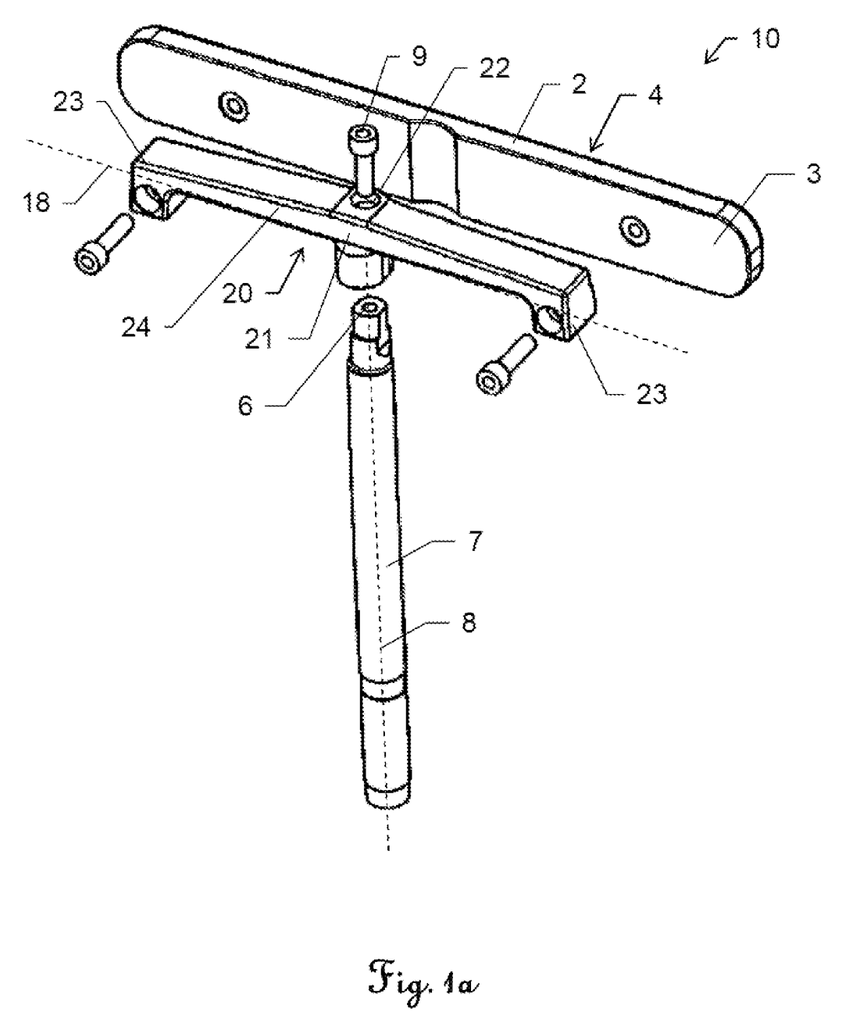
FIGS. 1a-b show an embodiment of a closure element and of a vacuum valve according to the prior art.
Figure 1B:
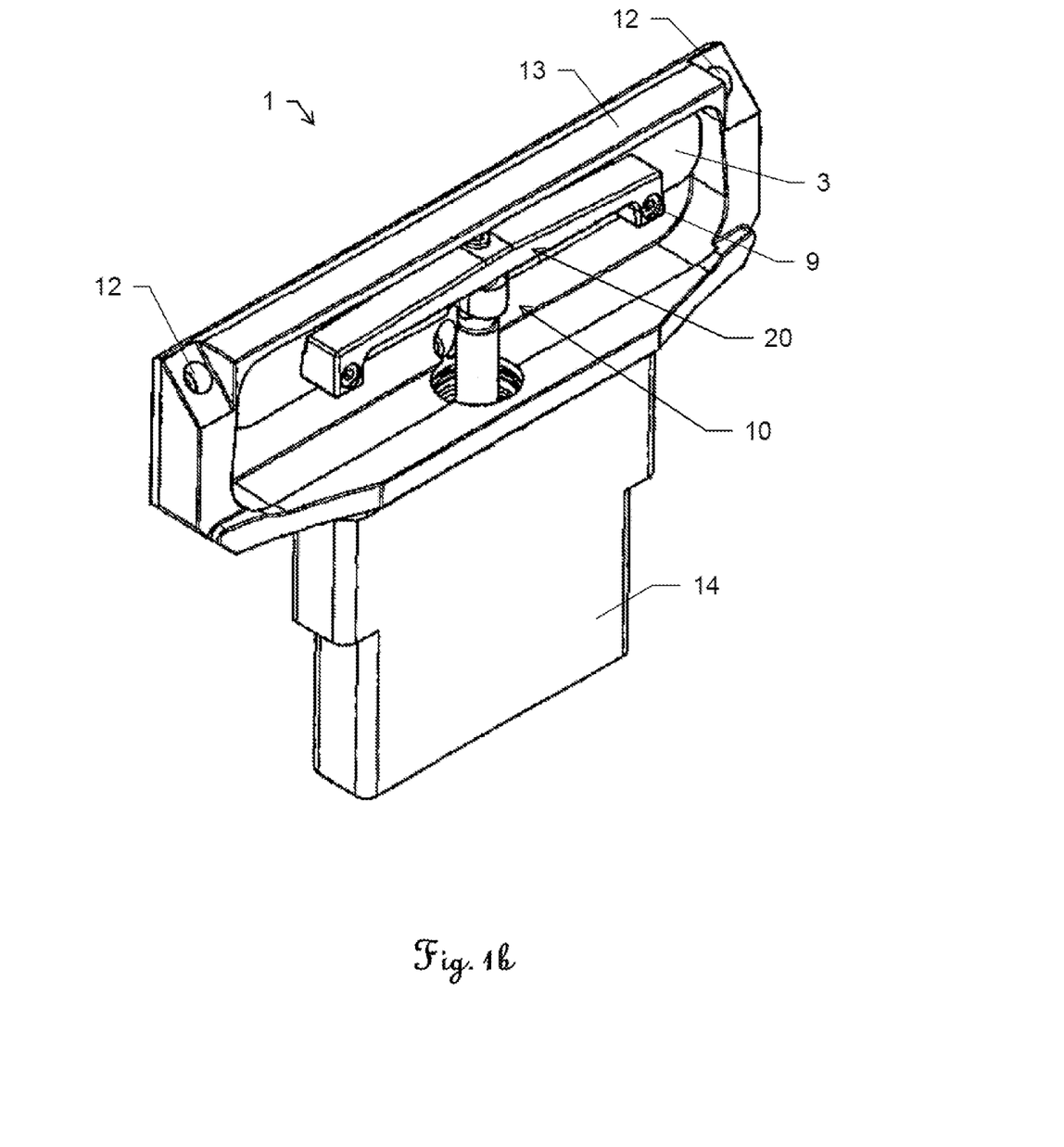

FIGS. 1a and 1b show a closure member 2 (valve disk) and an adjusting arm 7 with a cross carrier 20 in the form of an embodiment of the prior art. The cross carrier 20, which extends transversely with respect to an adjustment axis 8, is connected to the adjustment arm 7 at a connection point 21. Said connection point 21 comprises a screw 9, which is guided through a cylinder counter bore 22 and a through hole in the cross carrier 20 and engages in a thread, which is formed in a blind hole 6, on the adjustment arm 7.

The cross carrier 20 is connected to the closure member on the rear side 3 of the closure member 2, which side is located opposite the closure face 4, at two lateral connection points 23 which are located on both sides of the central connection point 21. Said lateral connection points 23 each comprise a screw 9, which is guided in each case through a through hole, formed in the cross carrier 20, with a cylinder counter bore and engages in a thread, formed on the rear side 3 of the closure member 2, in a blind hole. Consequently, in an abstract manner the cross carrier 20 forms a first component and in an abstract manner the closure member 2 forms a second component of a closure element 10.

In a central portion 24, which includes the central connection point 21 and portions 20 which connect to the same on both sides, and which extends between the lateral connection points 23, the cross carrier 20 is at a defined spacing from the rear side 3. In other words, the cross carrier 20 is arranged in the central portion 24 at a spacing to the rear side 3 and does not contact the closure member 2 in said region. In other words, the cross carrier 20 spans the rear side 3 of the closure member 2 and rests on the rear side 3 of the closure member 2 exclusively in the region of the lateral connection points 23.

The cross carrier 20, which is realized in one part from metal, is realized elastically in such a manner that, as a result of twisting the cross carrier 20 relative to the adjustment arm 7, the closure member 2 is pivotable about a pivot axis 18, which is at right angles to the adjustment axis 8 and extends parallel to a valve opening and to the valve seat.

The vacuum valve 1 additionally comprises two valve fastening holes 12 in the wall 13, by means of which the wall 13, which is coupled with the housing of the drive unit 14, is able to be mounted on a component, in particular on a vacuum chamber. Said fastening can also be effected by means of a screw connection.

Figure 2:
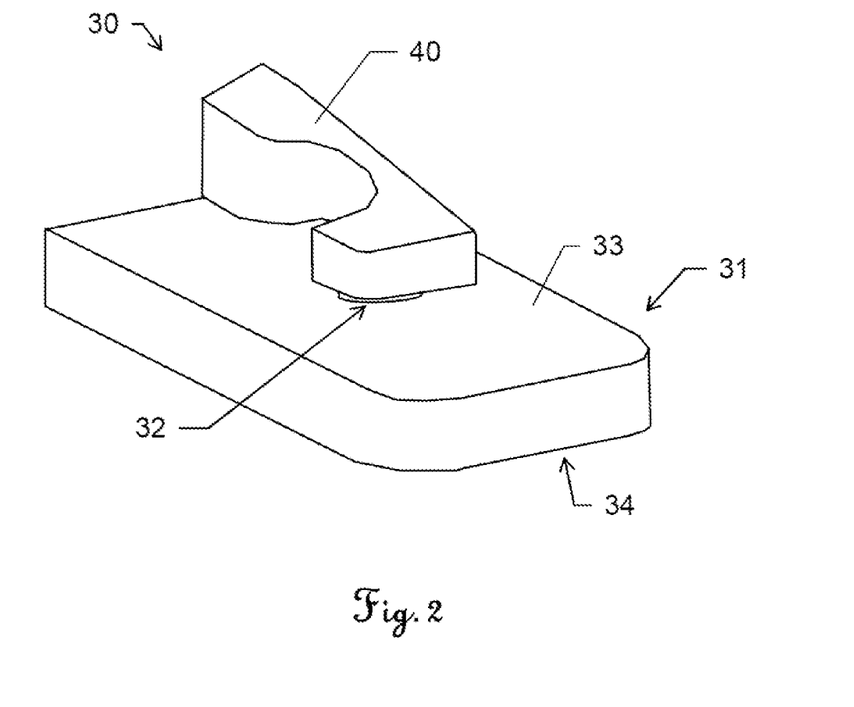
FIG. 2 shows part of a closure element according to the invention.

FIG. 2 shows part of a closure element 30 according to the invention. The closure element 30 comprises a valve disk 31 and a cross carrier 40 which is connected to the rear side 33 of the valve disk 31. The connection between the valve disk 31 and the cross carrier 40 is provided by means of a friction stir welding connection. A connection point 32 of, for example, a total of two connection points of the closure element 30 is shown here.

The friction stir welding connection has been generated from the side of the closure side 34 of the valve disk 31 such that the cross carrier 40 does not comprise any indentation or similar striking surface features whatsoever at the connection point. A detailed representation can be found in conjunction with FIG. 3.

Figure 3:
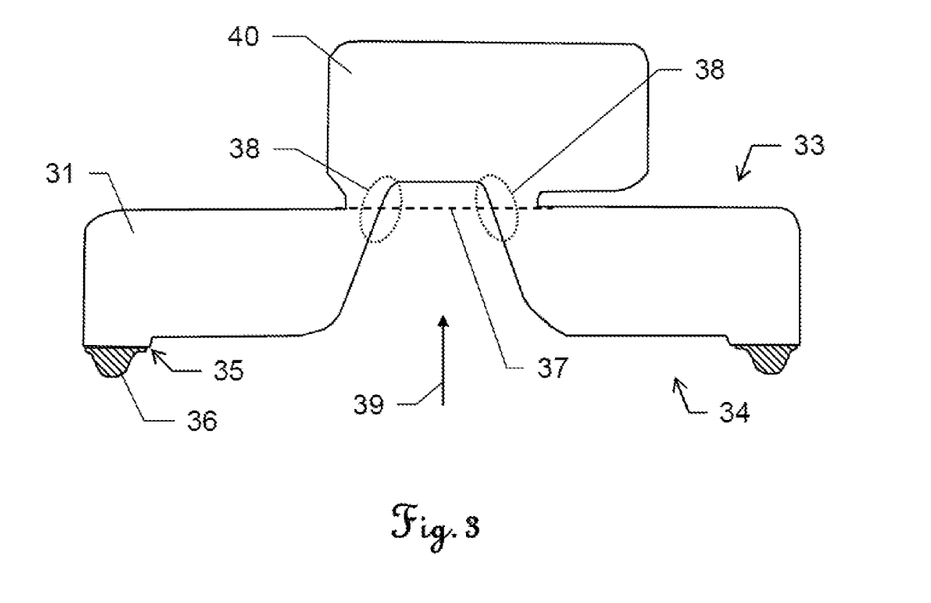
FIG. 3 shows a cross sectional view through the connection point of a valve disk which is connected to a cross carrier.

FIG. 3 shows a cross sectional view through the connection point of a valve disk 31 which is connected to a cross carrier 40. The broken line 37 illustrates the structural boundary, which was present prior to the connection operation, between the cross carrier 40 which has been separated from the valve disk 31.

When connecting the two parts (cross carrier 40 and valve disk 31) by means of the friction stir welding joining method, a rotating pin or punch is pressed in the direction of the arrow 39 shown onto the closure side 34 at a great amount of pressure. As a result, the material, here preferably metal or a metal alloy, of initially only the valve disk 31 is plasticized under the build-up of heat, i.e. moved from a solid state into a deformable or flowable state. The rotating punch is moved or pressed further in the direction of the arrow 39 until, as a result, the material of the cross carrier 40 is subsequently also plasticized in the region of the connection point. Consequently, both the material of the cross carrier 40 and that of the valve disk 31 are then present in a plastically deformable manner.

As a result of the rotational movement of the friction stir tool (pin, punch etc.), the materials of the two parts, present in said plastic state, are stirred into one another. Consequently, a connection between materials is created in the two regions 83. Said operation is effected typically at temperatures below the fusion points of the two materials. It is additionally advantageous, in this connection, that, in this case, a high static and dynamic connection is produced and no material splatters or smoke are created. No additional weld material, such as, for example, weld wire, is required either.

Once the friction stir tool has been removed, an indentation, which extends from the closure side 34 over the entire thickness of the valve disk 31 at the connection point and projects into the cross carrier 40, remains behind as shown. The cross carrier 40 is consequently fastened to the rear side 33 of the valve disk 31.

An indentation can already be provided at the connection point in the valve disk 31 on the closure side so that the mass of the material to be plasticized does not extend over the entire thickness of the valve disk 31 but is nevertheless sufficient to produce a sturdy connection between the parts.

The closure element additionally comprises a sealing material 36 which has been cured-on on the sealing face 35. The sealing face 35 and the sealing material 36 run around the valve disk 31 on the side of the closure side 34.

Figure 4A:
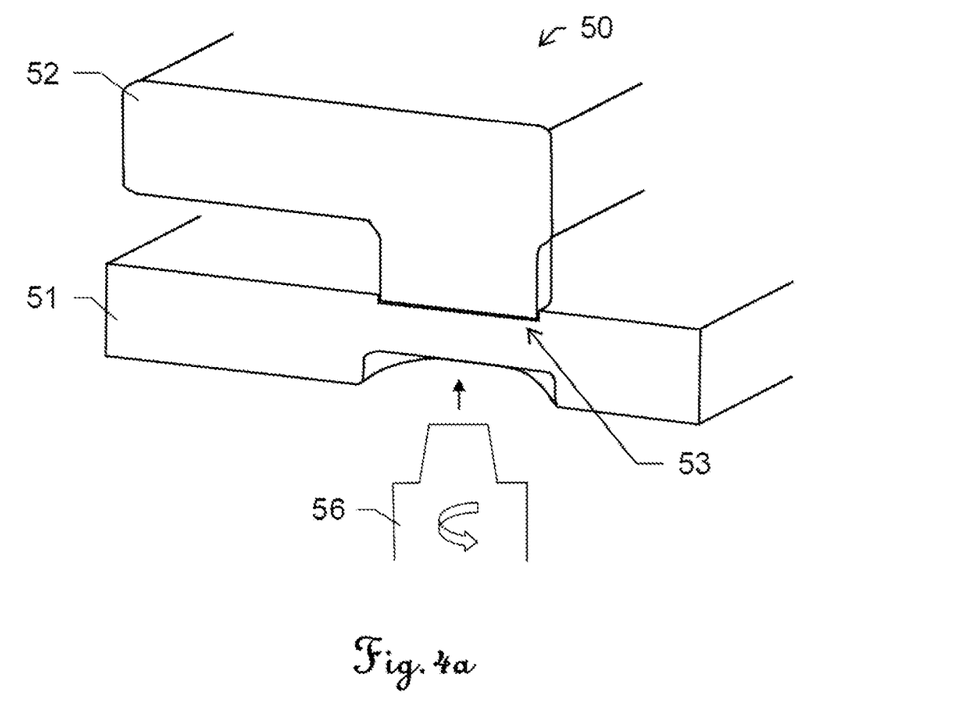
FIGS. 4a-b show in each case a cross sectional view of a closure element according to the invention in a separated state and in a connected state which is present after a friction stir welding connection.
Figure 4B:
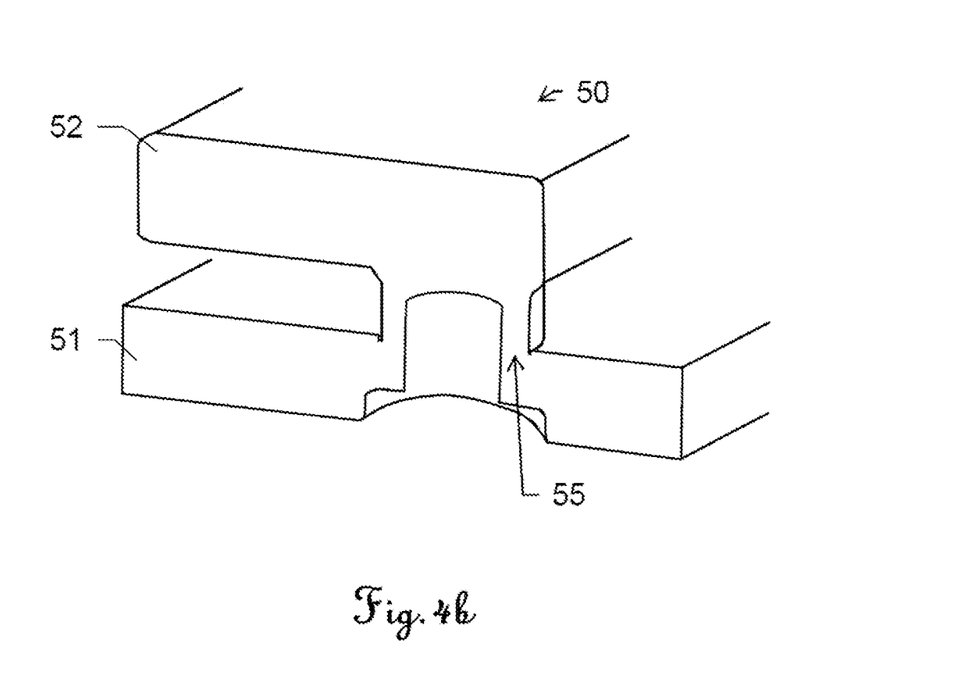

FIGS. 4a and 4b each show a cross sectional view of a closure element 50 according to the invention, firstly in a separated state (FIG. 4a) and then in a connected state (FIG. 4b) which is present after a friction stir welding connection.

It can be seen in FIG. 4a how a cross carrier 52 is positioned relative to a valve disk 51 prior to connecting said two components. An indentation, in which a corresponding counter piece of the cross carrier engages in a suitable manner, is provided at the required connection point 53, on the side of the valve disk 51 on the rear side thereof. In other words, the connection piece of the cross carrier 52 and the indentation of the valve disk 51 are developed in such a manner that they are connectable in a substantially precision-fitting manner.

As shown, in said state with the loose connection between the valve disk 51 and the cross carrier 52, a rotating friction stir welding tool 56, for example a pin, is moved in the direction of the arrow into the indentation on the side of the closure side of the valve disk 51. The tool 56 is pressed onto the surface of the indentation, the material of the valve disk 51 being plasticized with the build-up of heat. By moving the tool 56 further in the direction of the arrow, the material of the cross carrier 52 then also becomes deformable. The rotation of the tool 56, permanently in this case, results in the materials of the cross carrier 52 and of the valve disk being thoroughly mixed or stirred. When a desired degree of plasticization and stirring has been achieved, the rotational movement of the tool 56 is stopped and said tool is removed from the closure element 50 in opposition to the direction of the arrow.

As a result of said connecting operation, a closure element 50 with a friction stir welding connection 55 which connects the cross carrier 52 to the valve disk 51, is produced as shown in FIG. 4b. Contrary to a connection between the cross carrier 52 and the valve disk 51 disclosed in the prior art, no contamination of the connection point whatsoever, e.g. as a result of abrasion, is generated in this connection and no further materials, such as, for example, welding wire or screws, are required for producing the connection. Such a connection is consequently highly suitable for application in the vacuum or high vacuum range.

Figure 5:
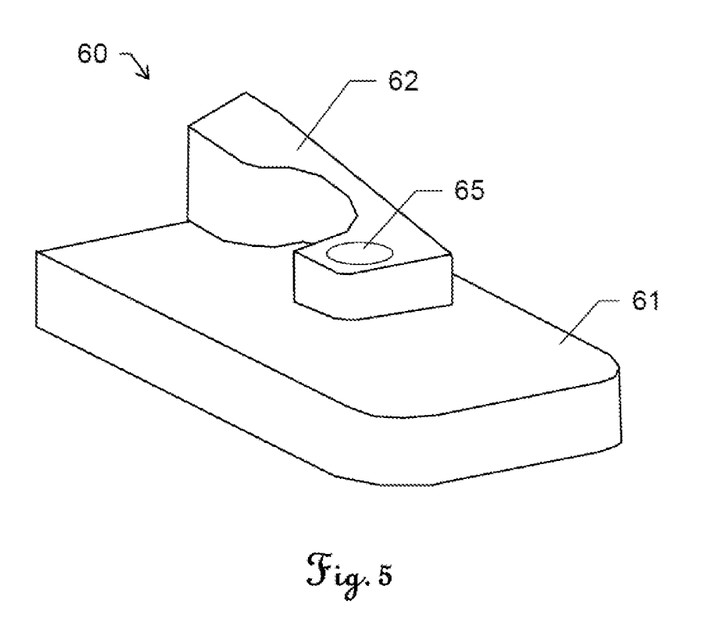
FIG. 5 shows a further embodiment of part of a closure element according to the invention.

FIG. 5 shows a further embodiment of part of a closure element 60 according to the invention. The friction stir welding connection present between the cross carrier 62 and the valve disk 61 is generated in this case on the side of the cross carrier 62. A remaining indentation 65 in the cross carrier 62, which results from interaction between a friction stir welding tool and the top surface of the cross carrier, can be seen.

The closure side of the valve disk 61, in this case, remains unaffected by structural changes on the surface.

It is obvious that the invention is not restricted to a special type of vacuum valve or to the closure elements thereof but includes all such objects for the purposes of producing a vacuum seal independent of, in particular, the form of the valve disk or of the drive mechanism. Thus, for example, a closure element with a cross carrier on an elongated valve disk is included equally as such a cross carrier on a round valve disk.

Possible fastening of a drive rod on the cross carrier can be realized, as already mentioned, by means of a screw, however as an alternative to this it can also be produced as a result of another permanent or releasable joining method. It is also possible for a drive rod and a cross carrier to be realized in an integral manner.

Figure 6:
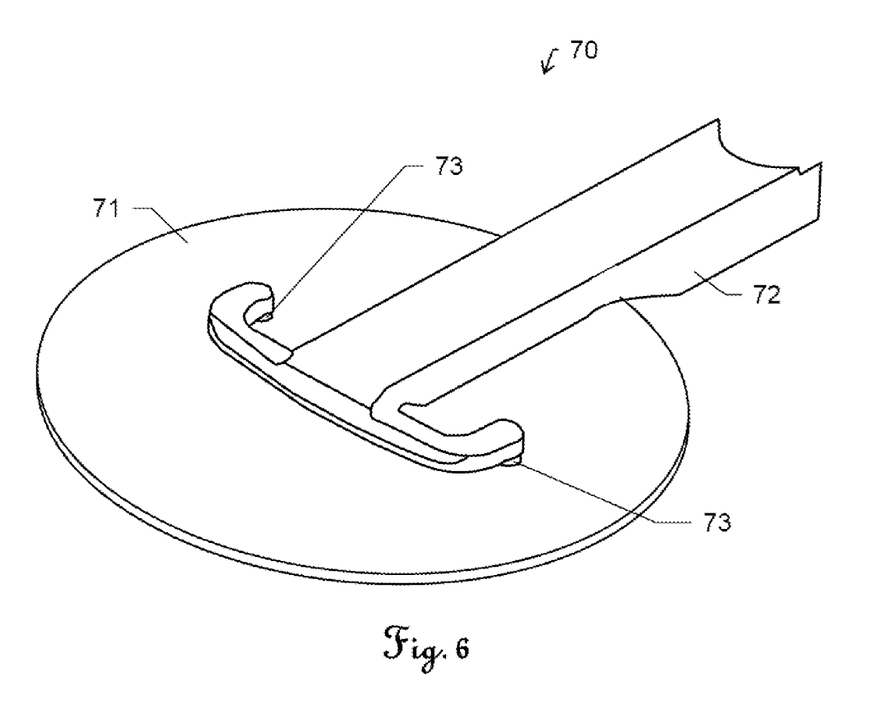
FIG. 6 shows a further embodiment of a closure element with a cross carrier according to the invention mounted on a valve disk.

FIG. 6 shows a further embodiment of a closure element 70 with a cross carrier 72 according to the invention mounted on a valve disk 71.

The cross carrier 72, in this case, is realized integrally in such a manner that a direct connection to a drive unit can be effected by means of the cross carrier 72 for moving the valve disk 71 (in a vacuum valve). The cross carrier 72 consequently already comprises a drive component, which enables the connection to the drive unit, as a lengthening element (e.g. as a valve rod). As a result, additionally mounting a valve rod onto the cross carrier 72, e.g. by means of an additional screw connection, can be omitted. Such a source of potential contamination in the valve system can consequently be reduced or completely avoided.

The connections 73 between the cross carrier 72 and the valve disk 71 are realized by friction stir welding connections such as, for example, shown and described in FIG. 4b. As a result, contaminating particle sources in the region of the connection 73 are avoided as extensively as possible even for a round valve disk 71 as shown.

Figure 7:
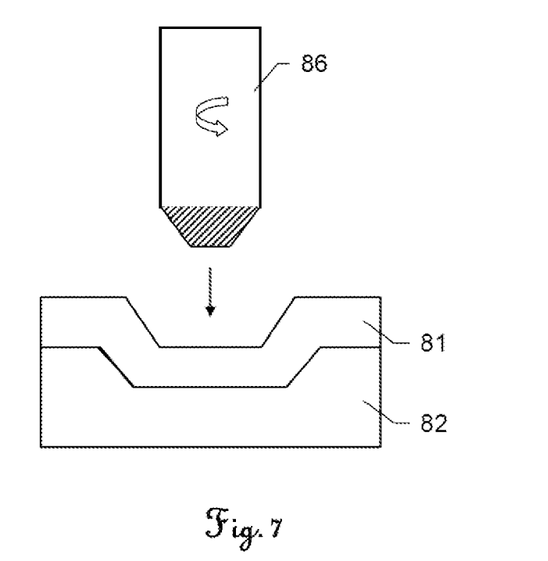
FIG. 7 shows a joining method for connecting a valve disk to a cross carrier according to the invention.

FIG. 7 shows a joining method for connecting a valve disk 81 to a cross carrier 82 according to the invention, like, for example, that shown by FIG. 6.

The connection point of the valve disk 81 is moved so as to match the position of the corresponding connection point of the cross carrier 82. Consequently, there is loose contact first of all between the two components at the two connection points. The two parts are held together by means of a suitable joining tool (not shown) and a possible flow of materials during the subsequent welding operation is prevented.

A pin 86, which embodies a connecting tool which is to produce the friction stir welding connection, is made to rotate about the longitudinal axis thereof and is moved in the direction of the connection point. The pin 86, in this connection, does not comprise, as otherwise usual in the case of such welding methods according to the prior art, any shoulder for the fixing of the two components and/or for holding the plasticized material.

The pin 86 is first of all pressed into the valve disk 81, or the material of the valve disk 81, at the connection point. In this case, the material at said point is plasticized on account of the resulting build-up of heat whilst the pin 86 is pressed further into the body.

After plasticization and penetration of the material of the valve disk 81, which is made possible as a result thereof, the pin 86 is pressed further into the material of the cross carrier 82, as a result of which said material is also plasticized. As a result of the rotational movement of the pin 86, the materials—when the materials of the two components are present in a paste-like or plasticized, i.e. plastically deformable, state—are thoroughly mixed and a material bond is consequently produced.

The pin 86 can be guided for this purpose along certain trajectories in a plane transversely (e.g. orthogonally) with respect to the longitudinal axis of the pin 86. Improved mixing of the materials to be joined and/or an enlarged joining region can be achieved as a result. An improved through-weld and consequently a homogeneous material transition between the two components can be achieved in an advantageous manner. In particular, it is consequently possible, in an ensured manner, to produce a gap-free connection between the parts.

Figure 8A:
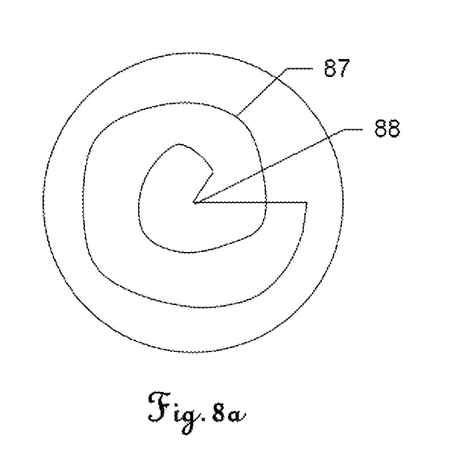
FIGS. 8a-b show trajectories for the guiding according to the invention of a connecting tool for producing a friction stir welding connection according to the invention.
Figure 8B:
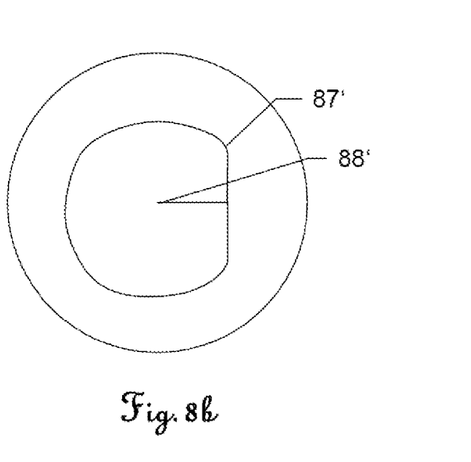

Such trajectories 87, 87' are shown as examples in FIGS. 8a and 8b. FIG. 8a shows a closed trajectory 87 in the form of a spiral. The center of the pin 86 is placed at the start/end point 88 and, whilst rotating, is pressed into the materials. The pin 86 is then moved in the horizontal plane along the path shown 87, as a result of which the materials are stirred in such a manner that a gap-free material transition between the components is produced.

FIG. 8b shows an alternative path 87' which is also closed and when said path is run through by the pin 86 a gap-free component connection is able to be produced.

It is obvious that the Figures shown only show schematic representations of possible exemplary embodiments. According to the invention, the different approaches are able to be combined with one another and with methods and devices for sealing process volumes under vacuum conditions of the prior art.

What is claimed is:

1. A closure element for a vacuum valve having
    a valve disk realized for a gas-tight closure of a process volume by means of interaction with a vacuum valve opening of the vacuum valve provided for the process volume,
    wherein the valve disk
        comprises a closure side and an oppositely situated rear side which is parallel thereto and
        a first sealing face which is assigned to the closure side and corresponds to a second sealing face of the vacuum valve opening, wherein the second sealing face runs around the vacuum valve opening, and
    a cross carrier, wherein the cross carrier is connected to the valve disk on the rear side of the valve disk at at least one connection point,
    wherein the connection of the cross carrier to the valve disk at the at least one connection point comprises a friction stir welding connection, whereby contaminating particle sources in the region of the connection are avoided, and
    wherein on the closure side the valve disk comprises an indentation which is assigned to the at least one connection point, wherein the indentation extends parallel to an axis which is orthogonal with respect to a plane which is defined by the form and/or surface of the rear side or of the closure side.

2. The closure element according to claim 1, wherein the cross carrier is connected to the rear side of the valve disk at two connection points, wherein each of the two are realized by means of a friction stir welding connection.

3. The closure element according to claim 2, wherein the receiving means is arranged or formed centrally on the cross carrier and the two connection points are arranged horizontally on both sides relative to the receiving means.

4. The closure element according to claim 1, wherein the indentation extends in the direction of the axis over a defined depth, wherein the depth is greater than a material thickness of the cross carrier or of the valve disk at the at least one connection point.

5. The closure element according to claim 1, wherein the indentation of the cross carrier is formed in such a manner that the indentation extends right through the cross carrier and projects into the valve disk.

6. The closure element according to claim 1, wherein the indentation of the valve disk is formed in such a manner that the indentation extends right through the valve disk and projects into the cross carrier.

7. The closure element according to claim 1, wherein a material bond, which is created by intermittent plasticizing of materials of the cross carrier and of the valve disk, is present in a transition region at the at least one connection point, wherein the transition region is defined at the at least one connection point by a portion which extends along an axis via a contact point of the cross carrier with the valve disk, the axis is orthogonal with respect to a plane which is defined by the form and/or surface of the rear side or of the closure side.

8. The closure element according to claim 1, wherein the friction stir welding connection embodies a homogeneous material transition between the valve disk and the cross carrier.

9. The closure element according to claim 1, wherein the first sealing face comprises a cured-on sealing material and corresponds to the second sealing face of the vacuum valve opening with regard to form and size.

10. The closure element according to claim 1, wherein the cross carrier comprises a receiving means for a drive component transversely with respect to an extension direction of the cross carrier.

11. A vacuum valve for the gas-tight closure of a process volume, said vacuum valve comprising:
 a valve housing which comprises a vacuum valve opening and a valve seat which runs around the vacuum valve opening and comprises a second sealing face,
 a valve disk for the substantial gas-tight closing of the vacuum valve opening with a first sealing face which corresponds to the second sealing face, the valve disk comprises a closure side and an oppositely situated rear side which is substantially parallel thereto, a cross carrier, wherein the cross carrier is connected to the valve disk on the rear side of the valve disk at at least one connection point,
 a drive unit which is coupled with the cross carrier, which drive unit is realized in such a manner that the valve disk is adjustable from an open position, in which the valve disk releases the vacuum valve opening, into a closed position, in which the first sealing face of the valve disk is pressed onto the second sealing face and the vacuum valve opening is closed in a gas-tight manner,
 and back,
 wherein the connection between the cross carrier and the valve disk at the at least one connection point comprises a friction stir welding connection, whereby contaminating particle sources in the region of the connection are avoided, and
 wherein on the closure side the valve disk comprises an indentation which is assigned to the at least one connection point, wherein the indentation extends parallel to an axis which is orthogonal with respect to a plane which is defined by the form and/or surface of the rear side or of the closure side.

12. The vacuum valve according to claim 11, wherein the cross carrier comprises a receiving means for a drive component transversely with respect to an extension direction of the cross carrier.

13. The vacuum valve according to claim 11, wherein as a result of a capability of the valve disk to move along a geometric transverse axis, which extends at right angles with respect to the longitudinal axis, the valve disk is adjustable in a transverse closing direction into an intermediate position, in which the valve disk covers the vacuum valve opening and a closure side of the valve disk is situated in a position at a spacing opposite the valve seat, and back.

14. The vacuum valve according to claim 11, wherein the valve disk and the cross carrier comprises a closure element, wherein the valve disk comprises a closure side and an oppositely situated rear side which is parallel thereto and a first sealing face which is assigned to the closure side and corresponds to a second sealing face of the vacuum valve opening, wherein the second sealing face runs around the vacuum valve opening, and wherein the cross carrier is connected to the valve disk on the rear side of the valve disk at at least one connection point, and wherein the connection of the cross carrier to the valve disk at the at least one connection point comprises a friction stir welding connection.

* * * * *